United States Patent [19]
Arisato

[11] Patent Number: 5,462,084
[45] Date of Patent: Oct. 31, 1995

[54] QUICK-ACTING COUPLING

[75] Inventor: Akira Arisato, Kobe, Japan

[73] Assignee: Kabushiki Kaisha Kosmek, Hyogo, Japan

[21] Appl. No.: 388,516

[22] Filed: Feb. 14, 1994

[30] Foreign Application Priority Data

Mar. 1, 1994 [JP] Japan .................................. 6-030736

[51] Int. Cl.$^6$ ................................................. F16L 37/28
[52] U.S. Cl. ................................ 137/614.03; 137/614.06
[58] Field of Search ........................ 137/614.03, 614.06

[56] References Cited

U.S. PATENT DOCUMENTS

| | | | |
|---|---|---|---|
| 3,706,318 | 12/1972 | Baniadam et al. | 137/614.03 |
| 4,592,387 | 6/1986 | Rogers | 137/614.06 |
| 4,953,592 | 9/1990 | Takahashi et al. | |
| 4,971,107 | 11/1990 | Yonezawa. | |
| 4,989,630 | 2/0591 | Yonezawa. | |

*Primary Examiner*—John C. Fox
*Attorney, Agent, or Firm*—Bacon & Thomas

[57] ABSTRACT

A cylindrical case (8) is inserted hermetically into a first housing (1) of a socket (A), and the cylindrical case (8) is urged rightward by an advancing spring (9). A sliding cylinder (20) is inserted hermetically into the cylindrical case (8), and the sliding cylinder (20) is urged rightward by another advancing spring (28). As the socket (A) and a plug (B) are connected toward each other, a pushing member (65) arranged at the leading end portion of a second housing (2) of the plug (B) makes the sliding cylinder (20) retreat to an opening position on the left side as well as a first closing member (26) inserted into the sliding cylinder (20) pushes a second closing member (62) inserted into the second housing (2) to, an opening position on the right side.

7 Claims, 7 Drawing Sheets

FIG. 1
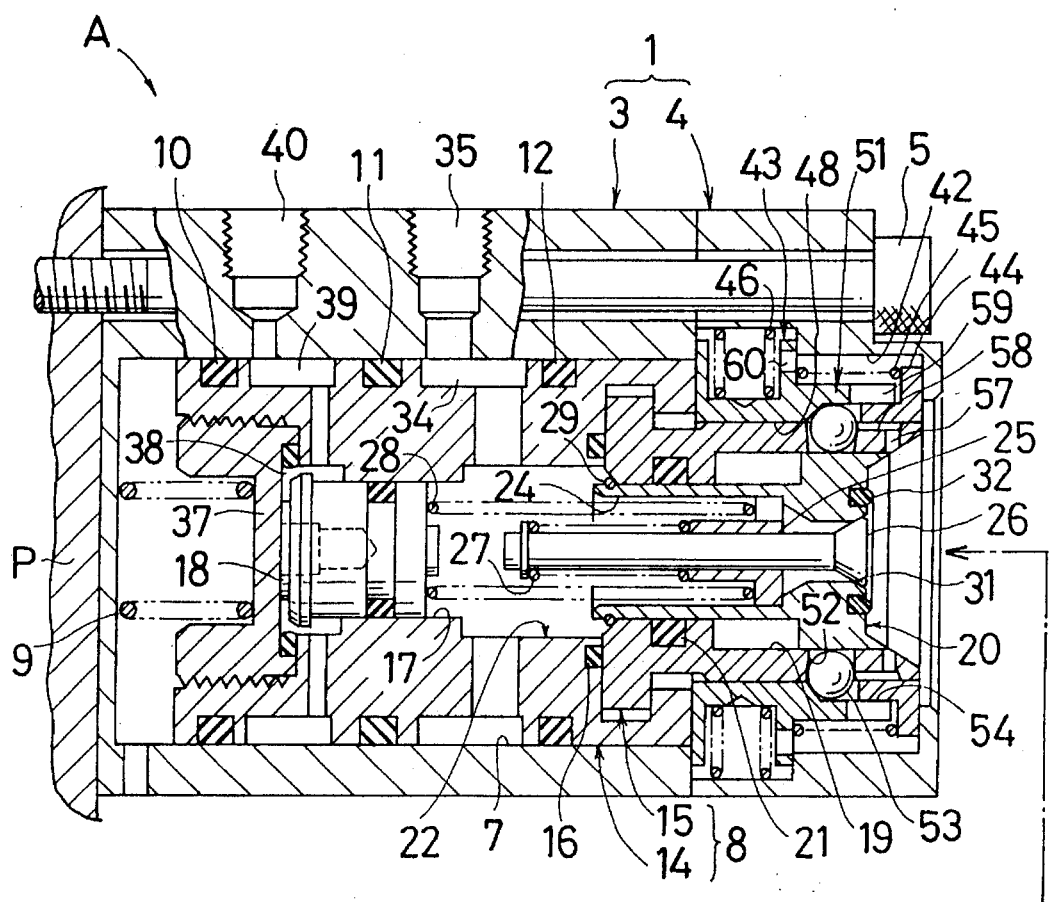
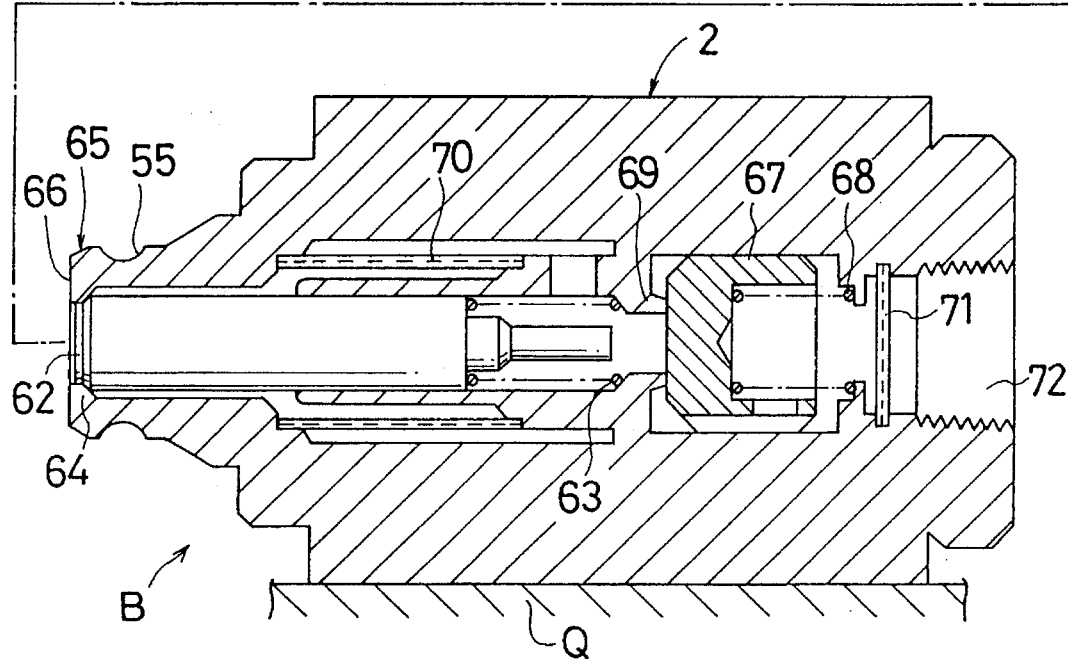

QUICK-ACTING COUPLING

BACKGROUND OF THE INVENTION

1. Field of the Invention

The present invention relates to a quick-acting coupling which is employed for quickly connecting or disconnecting halfway portions of a pressure pipeline such as a hydraulic pipeline.

2. Description of Prior Art

Conventionally, as such a quick-acting coupling there has been known a one disclosed in U.S. Pat. No. 4,971,107. This conventional quick-acting coupling is the one previously proposed by the assignee of the present invention and has the following constitution as illustrated in FIG. 7.

A sliding cylinder 120 is inserted into a first housing 101 of a socket A as a first coupling through an O-ring 121 so as to be oil-tightly movable, a first closing member 126 is inserted into the sliding cylinder 120, and a first cheek member 133 is connected to the first closing member 126. A second closing member 162 is inserted into a second housing 102 of a plug B as a second coupling, and there is a second cheek member 167.

As the socket A and the plug B are faced and connected toward each other, a pushing member 165 arranged at the leading end portion of the second housing 102 makes the sliding cylinder 120 retreat to an opening position on the left side against an advancing spring 128, the first closing member 126 pushes the second closing member 162 to an opening position on the right side against an advancing spring 163 as well as the second closing member 162 makes the second check member 167 move to a valve-opening position. When a pressure oil is supplied to a supply-discharge port 135 for the socket under the connection completed condition, the pressure oil is supplied to a supply-discharge port 172 for the plug along an outer periphery of the first closing member 126 and an outer periphery of the second closing member 162 in order.

There are, however, the following problems accompanied with the above-mentioned prior art.

Since the sliding cylinder 120 is sealed by the O-ring 121 at the time of supplying of the pressure oil, a hydraulic pressure applied to an inner cross-sectional area of a sealing portion of the O-ring 121 tends to strongly separate both the housings 101, 102 leftward and rightward. Therefore, a pushing device such as a pneumatic cylinder for performing a connecting operation between the socket A and the plug B is required to have an extra capability by such a large separating force and thus becomes large in size and weight. Further, since the large separating force acts thereon as mentioned above, also a support member such as brackets for supporting the socket A and the plug B becomes large in size and weight.

In the above-mentioned conventional embodiment, further the following problems appears.

Under the connected condition illustrated in FIG. 7, since the second check member 167 is always held in a valve opened state by the second dosing member 162, when the pressure oil supply to the supply-discharge port 135 for the socket is stopped, the pressure oil within the supply-discharge port 172 for the plug is discharged through the supply-discharge port 135 for the socket. Therefore, in order to maintain a pressure within the supply-discharge port 172 for the plug also after the separation of both the couplings A, B, it is necessary to separate both the couplings A, B while the pressure oil is continuously supplied to the supply-discharge port 135 for the socket As a result, the pressure oil is apt to leak from the sealing contact portion between the sliding cylinder 120 and the pushing member 165.

SUMMARY OF THE INVENTION

It is an object of the present invention to decrease a pushing force required for connection between both couplings.

It is another object of the present invention to enable both couplings to be separated under the stopped condition of pressure fluid supply.

Invention of Claim 1

The invention of claim 1 is constituted as follows, for example as shown in FIGS. 1 through 6.

When a first coupling A and a second coupling B are faced and connected to each other, a sliding cylinder 20 disposed within a first housing 1 of the first coupling A is retreated to an opening position by a pushing member 65 disposed at a leading end portion of a second housing 2 of the second coupling B, and a second closing member 62 inserted into the second housing 2 is pushed to an opening position by a first closing member 26 inserted into the sliding cylinder 20. A cylindrical case 8 is inserted hermetically into the first housing 1 to be able to advance and retreat axially. The sliding cylinder 20 is inserted hermetically into a bore 22 of the cylindrical ease 8 to be able to advance and retreat axially. The cylindrical ease 8 is urged by an advancing means 9 toward the leading end with respect to the first housing 1. The cylindrical case 8 and the second housing 2 are connected and disconnected by an engagement means 51. Between the cylindrical case 8 and the first housing 1 there is provided a clearance N for allowing the cylindrical case 8 to retreat toward the base end at the time of completion of the connection of both the couplings A, B.

Incidentally, as the advancing means 9 may be used an elastic member such as a spring and a rubber and a resilient pushing means such as a pneumatic spring. As an engagement means 51, it is preferable to use such a means that is provided with a ball 53 for connecting and disconnecting the cylindrical case 8 to and from the second housing 2 at the time of connection and disconnection between both the couplings A, B.

The invention of claim 1 functions as follows, for example as shown in FIGS. 1 through 6.

Under the separated condition of FIG. 1, the cylindrical case 8 of the first coupling A is urged by the advancing means 9 to an advancement position on the right side as well as the sliding cylinder 20 is advanced to the closing position on the right side, and the second closing member 62 of the second coupling B is advanced to the closing position on the left side.

Both the couplings A, B operate as follows at the time of facing and connection thereof.

Firstly, as shown in FIG. 2, the sliding cylinder 20 and the pushing member 65 are brought into contact with each other, then as shown in FIG. 3, the sliding cylinder 20 is retreated leftward by the pushing member 65. Subsequently, as shown in FIG. 4, the first closing member 26 and the second closing member 62 are switched to the opening position under the abutted condition against each other, and finally as shown in FIG. 5, the connection between both the couplings A, B is completed. Under the connection completed condition as shown in FIG. 5, the cylindrical ease 8 and the second housing 2 are connected integrally by the engagement means 51, and the clearance N allowing the cylindrical case 8 to retreat leftward is provided on a left outside of the case 8.

Under the connection completed condition, the pressure fluid is supplied from the supply-discharge port 35 of the first coupling A to the bore 22 of the cylindrical ease 8. Thereupon, though the fluid pressure applied to the inner cross-sectional area of the sealing portion of the O-ring 21 for sealing the sliding cylinder 20 acts as a separating force on the cylindrical case 8 and the second housing 2, this separating force is received by the engagement means 51. Therefore, the fluid pressure doesn't act as an external force on the second housing 2 and the cylindrical case 8, so that it doesn't act as the external force also on the first housing 1.

As mentioned above, since the fluid pressure applied to the sliding cylinder 20 doesn't act as the force for separating both the housings 1, 2, the pushing force required for connecting both the housings 1, 2 becomes smaller by that portion. Therefore, when the connecting operation is carried out by a pushing device employing a pneumatic cylinder and the like, it is possible to manufacture the pushing device small in size and light in weight and also to manufacture the support member such as a bracket for supporting each housing 1, 2 small in size and light in weight.

Invention of Claim 2

The invention of claim 2 is constituted by adding the following constitution to the constitution of claim 1.

An entire stroke D of the cylindrical case 8 is set to a value larger than a value obtained by subtracting an advancing-retreating stroke E of the sliding cylinder 20 from a connection stroke S for both the housings 1, 2.

The invention of claim 2 functions as follows.

When both the couplings A, B are faced and connected to each other, the sliding cylinder 20 is retreated by the advancing-retreating stroke E (refer to FIG. 2 ) during the transition from the connection starting condition illustrated in FIG. 2 to the condition illustrated in FIG. 4 and then as shown in FIG. 5, the cylindrical case 8 is retreated leftward by a stroke M which is a value obtained by subtracting the advancing-retreating stroke E from the connection stroke S for both the housings 1, 2. By setting the entire stroke D (refer to FIG. 4 ) of the cylindrical case 8 to a value which is larger than the stroke M, it becomes possible to secure the retreat-allowing clearance N on the left outside of the cylindrical case 8 even when the case 8 is retreated. Therefore, it is possible to reliably prevent the fluid pressure acting on the sliding cylinder 20 from acting on the first housing 1 and the second housing 2.

Invention of Claim 3

The invention of claim 3 is constituted by adding the following constitution to the constitution of claim 1 or claim 2.

A check member 67 to be urged to a closing position on the leading end side is disposed within the base end portion of the second housing 2 to provide a clearance H between the check member 67 at the closing position and the second closing member 62 at the opening position. A piston 18 is inserted hermetically into the bore 22 of the cylindrical case 8 to be able to advance and retreat axially as well as the piston 18 is made to face the first closing member 26 from the base end side. An advancing-retreating stroke K of the piston 18 is set to a larger value than the clearance H.

The invention of claim 3 functions as follows.

Under the connection completed condition illustrated in FIG. 5, when the pressure fluid is supplied from the supply-discharge port 35 of the first coupling A to the cylindrical case 8, the pressure fluid makes the check member 67 separate from a check valve seat 69 against a check spring 68 so as to be supplied to the supply-discharge port 72 of the second coupling B. When the pressure of the supply-discharge port 72 reaches a predetermined pressure, the check member 67 is brought into closing contact with the check valve seat 69 by the check spring 68. After that, the two couplings A, B are separated by stopping the supply of the pressure fluid to the first coupling A.

When the pressure fluid is discharged from the supply-discharge port 72 of the second connected again and then, as shown in FIG. 5, both the couplings A, B are connected again and then, as shown in FIG. 6, the pressure fluid is supplied to another supply-discharge port 40 to advance the piston 18 by the advancing-retreating stroke K. Thereupon, the check member 67 is separated from the check valve seat 69 by the piston 18 through the first closing member 26 and the second closing member 62 in order. Thereby, the pressure fluid within the supply-discharge port 72 of the second coupling B is discharged to the supply-discharge port 35 of the first coupling A.

As mentioned above, in the case that the pressure within the supply-discharge port 72 of the second coupling B is increased by the supply of the pressure fluid to the supply-discharge port 35 of the first coupling A, when the pressure within the supply-discharge port 72 of the second coupling B reaches the predetermined pressure, the check member 67 is closed automatically. Therefore, after the pressure within the supply-discharge port 72 of the second coupling B has been increased once, both the couplings A, B can be separated under the no-load condition in which the pressure supply to the supply-discharge port 35 of the first coupling A is stopped. As a result, at the time of that separation, it becomes possible to prevent the pressure fluid from leaking from a sealing portion between the pushing member and the sliding cylinder 20.

Invention of Claim 4

In the invention of claim 4, since by one case portion 14 of the cylindrical case 8, the other case portion 15 thereof is supported so as to be able to diametrally move hermetically under a blocked condition of its axial movement and the sliding cylinder 20 is inserted hermetically into the other case portion 15 so as to be able to advance and retreat axially, it is possible to compensate an axial misalignment at the time of connection between both couplings A, B.

Invention of Claim 5

In the invention of claim 5, since the advancing means 9 is constituted by a spring, it is possible to manufacture the advancing means 9 simply in constitution and inexpensively.

Those and still other objects and advantages will be apparent from the following description of the embodiment and its modifications of the present invention when taken in conjunction with the attached drawings.

BRIEF DESCRIPTION OF THE DRAWINGS

FIGS. 1 through 6 show one embodiment of the present invention;

FIG. 1 is a vertical sectional view of the separated condition of a quick-acting coupling;

FIG. 2 is a schematic view showing the connection starting condition of the coupling;

FIG. 3 is a schematic view showing the condition that a sliding cylinder arranged in the coupling starts to open;

FIG. 4 is a schematic view showing the fully opened condition of the sliding cylinder;

FIG. 5 is a schematic view showing the connection completed condition of the coupling;

FIG. 6 is a schematic view showing the condition that a check member arranged in the coupling is forcibly opened.

DESCRIPTION OF THE PREFERRED EMBODIMENTS

Figure 2:
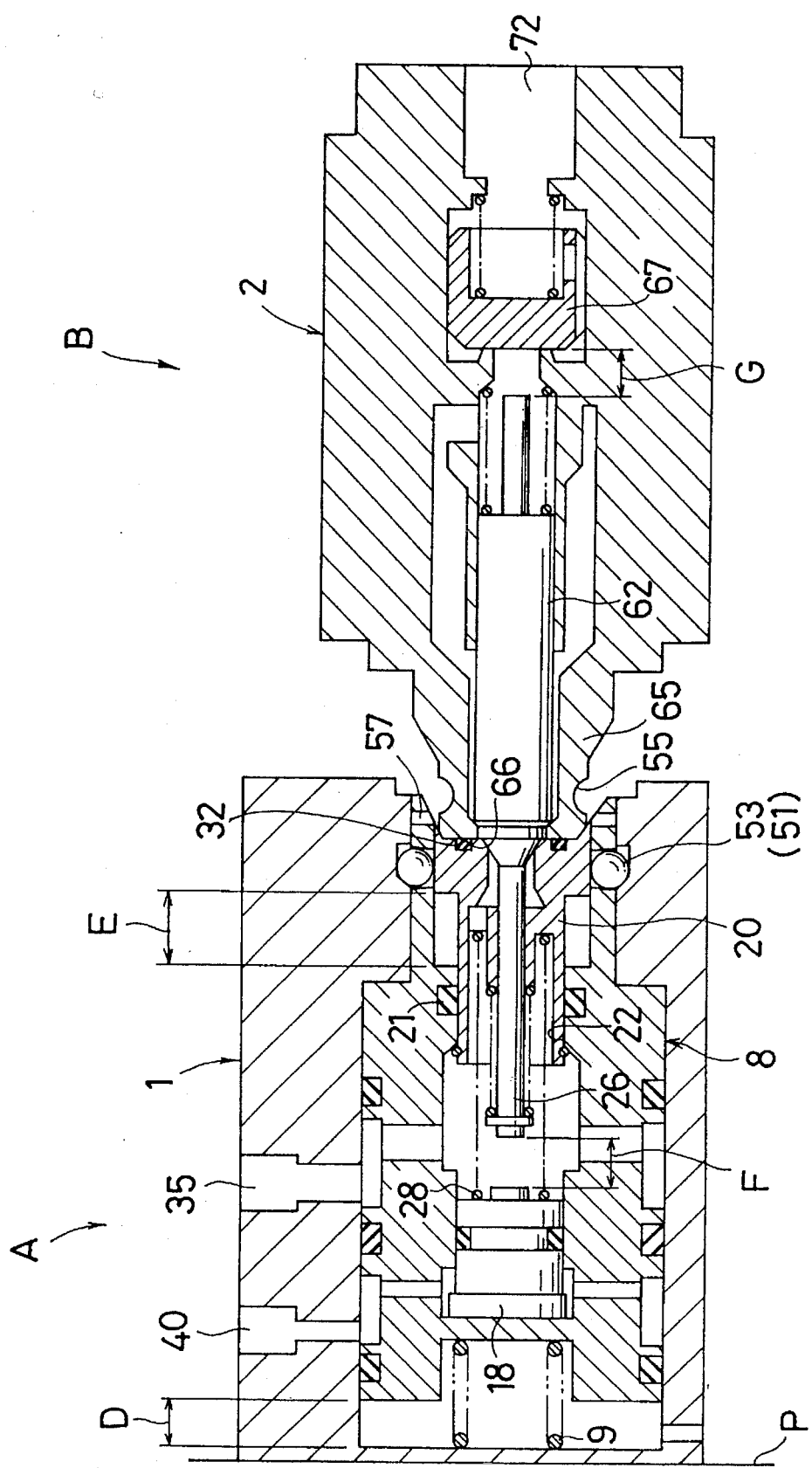

One embodiment of the present invention will be explained with reference to FIGS. 1 through 6 hereinafter.

Firstly, a constitution of the quick-acting coupling will be explained with reference to FIG. 1. This quick-acting coupling is used for supplying and discharging pressure oil and constituted by a socket A as a first coupling and a plug B as a second coupling. A first housing 1 of the socket A and a second housing 2 of the plug B are arranged so as to face each other substantially coaxially.

The socket A is constituted as follows.

The first housing 1 comprises left and right housing portions 3, 4, and these housing portions 3, 4 are fixedly secured to a base P by a plurality of bolts 5 (herein, only one bolt is shown).

A cylindrical case 8 is inserted hermetically into a bore 7 of the left housing portion 3 so as to be able to advance and retreat axially, and the cylindrical case 8 is urged toward its leading end by an advancing spring 9 as an advancing means. The symbols 1 0, 11, 12 designate O-rings.

The cylindrical case 8 comprises left and right case portions 14, 15, and the right case portion 15 is supported by the left case portion 14 so as to be hermetically movable radially under the blocked condition of its axial movement. The symbol 16 designates an O-ring. A piston 18 is inserted hermetically into a bore 17 of the left ease portion 14 so as to be able to advance and retreat axially. A sliding cylinder 20 is inserted hermetically into a bore 19 of the right ease portion 15 so as to be able to advance and retreat axially. The symbol 21 designates an O-ring. A bore 22 of the cylindrical case 8 comprises the left and right bores 17, 19.

A guide member 25 is fitted internally into a bore 24 of the sliding cylinder 20, and a first closing member 26 is inserted into the guide member 25 so as to be able to advance and retreat axially, and the piston 18 is faced the first closing member 26 from the base end side (the left side). The first closing member 26 is urged by a retreating spring 27 to a dosing position on the base end side, and the sliding cylinder 20 is urged to a dosing position on the leading end side (the right side ) by an advancing spring 28 disposed between the guide member 25 and the piston 18. The sliding cylinder 20 is prevented by a stopper ring 29 from advancing not less than a predetermined distance.

In the sliding cylinder 20, a first closing valve seat 31 is formed at the leading end of the bore 24 and a sealing member 32 is disposed around the closing valve seat 31. An interior space of the bore 24 is communicated with a supply-discharge port 35 for the socket through a peripheral groove 34 formed between the O-rings 11, 12. An actuation chamber 38 is formed between the piston 18 and a left end wall 37 of the left case portion 14, and the actuation chamber 38 is communicated with another supply-discharge port 40 through a peripheral groove 39 formed between the O-rings 1 0, 11.

Between a bore 42 of the right housing portion 4 and the right case portion 15, an eccentric movement allowed cylinder 43 is mounted so as to be movable radially under the blocked condition of its axial movement. A sleeve 44 is interposed between the leading end portion of the eccentric movement allowed cylinder 43 and the leading end portion of the right case portion 15, and both these 43, 44 are urged by a pushing spring 45 in the separating directions. The eccentric movement allowed cylinder 43 is urged centripetally by a plurality of aligning springs 46, so that the bore 19 of the right case portion 15 can be positioned substantially coaxially with the bore 17 of the left case portion 14. The eccentric movement allowed cylinder 43 prevents the cylindrical case 8 from being advanced not less than a predetermined distance toward the leading end side by the advancing spring 9.

There is provided an engagement means 51 for connecting and disconnecting the cylindrical case 8 to and from the second housing 2 at the time of connection and disconnection between the socket A and the plug B. This engagement means 51 has a plurality of through-holes 52 formed in a peripheral wall of the right case portion 15, bails 53 inserted into the respective through-holes 52 and a retreat groove 54 formed in an inner peripheral sur face of the eccentric movement allowed cylinder 43. The plurality of balls 53 are able to engage with a peripheral groove 55 formed in the leading end portion of the second housing 2.

Further, a plurality of ejection ports 57 for ejecting cleaning pressure air are formed at the leading end portion of the bore 19 of the right case portion 15. The respective ejection ports 57 are communicated with an air supply port for air blowing (not illustrated ) through a groove 58 formed in the outer peripheral wall of the right case portion 15, a groove 59 and a communication port 60 formed in the eccentric movement allowed cylinder 43 in order.

The plug B is constituted as follows. The second housing 2 is fixedly secured to a movable support Q, and a second closing member 62 is inserted into the second housing 2 so as to be movable axially. The second closing member 62 is urged by an advancing spring 63 to a second valve seat 64 on the leading end side (the left side). A pushing member 65 to be faced the sliding cylinder 20 of the socket A is disposed around the second closing valve seat 64. A sealing surface 66 to be faced the sealing member 32 is formed in a leading end surface of the pushing member 65. A check member 67 is inserted into a base side portion of the second housing 2 so as to be able to advance and retreat axially, and the check member 67 is urged by a check spring 68 to a check valve seat 69 on the leading end side. The symbols 70, 71 designate filters, and the symbol 72 does a supply-discharge port for the plug.

The quick-acting coupling having the above-mentioned constitution operates as follows at the time of connection between the socket A and the plug B.

Under the separated condition illustrated in FIG. 1, the plug B is advanced toward the socket A. Thereupon, the pushing member 65 of the plug B is fitted into the right case portion 15 of the socket A, and the leading end surface of the sealing member 32 and the sealing surface 66 start to be cleaned by the air blowing from the ejection port 57.

Then, as shown in FIG. 2, the sealing surface 66 of the plug B is brought into sealing contact with the sealing member 32 of the socket A as well as the pushing member 65 starts to retreat the sliding cylinder 20 and the first dosing member 26 leftward against the advancing spring 28. In FIG. 2, the symbol D designates an entire stroke of the cylindrical case 8, the symbol E does an advancing-retreating stroke of the sliding cylinder 20, the symbol F does a contact clearance for the first closing member 26, and the symbol G does a contact clearance for the second closing member 62. Incidentally, under this condition, the outer peripheral surface of the pushing member 65 and the peripheral groove 55 have started to be cleaned by the air blowing from the ejecting port 57.

Figure 3:
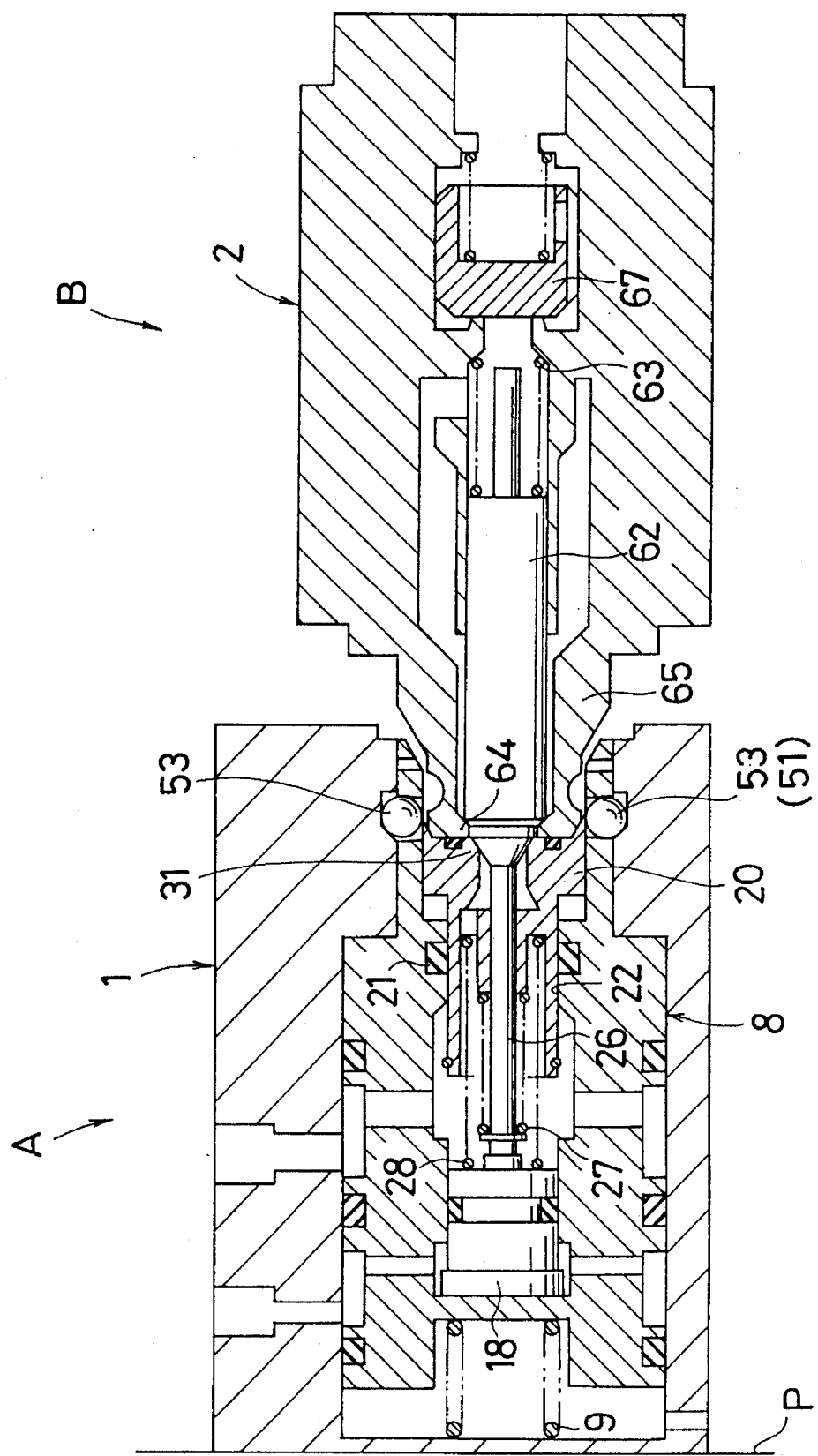

As shown in FIG. 3, when the sliding cylinder 20 and the first dosing member 26 are retreated further leftward and the first closing member 26 is received by the piston 18, the sliding cylinder 20 is further retreated leftward by the pushing member 65 against the advancing spring 28 and the retreating spring 27 as well as the second closing member 62 starts to be retreated rightward by the first closing member 26 against the advancing spring 63.

Figure 4:
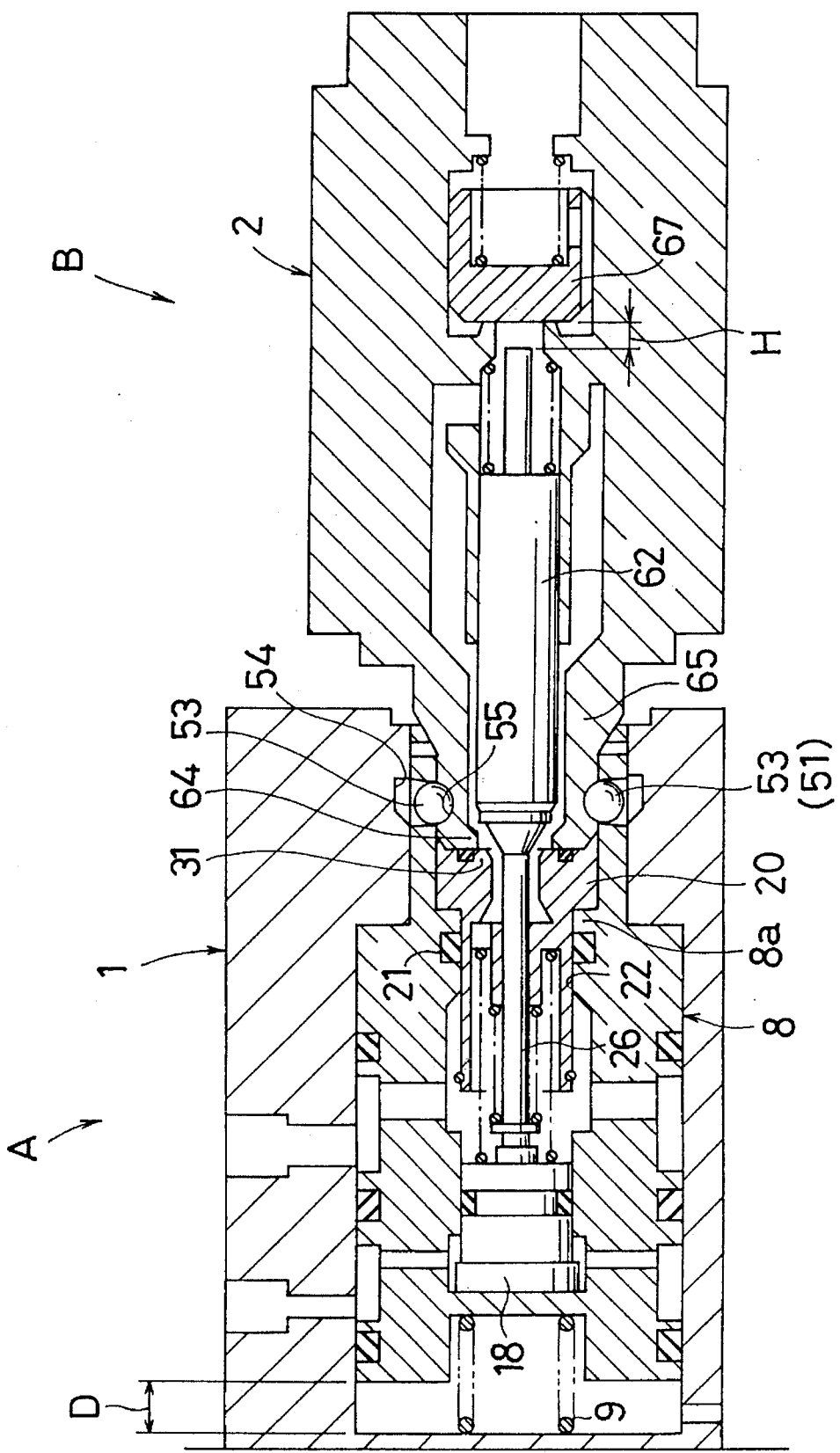

As shown in FIG. 4, when the sliding cylinder 20 is further retreated leftward and is brought into contact with a shoulder portion 8a of the cylindrical case 8, the first closing valve seat 31 is separated from the first closing member 26 as well as the second dosing member 62 is separated from the second closing valve seat 64 and the plurality of balls 53 are fitted into the peripheral groove 55. Thereby, the cylindrical case 8 and the second housing 2 are connected integrally to each other. Under this connected condition, there is provided a clearance H between the second closing member 62 at the opening position and the check member 67 at the closing position.

Figure 5:
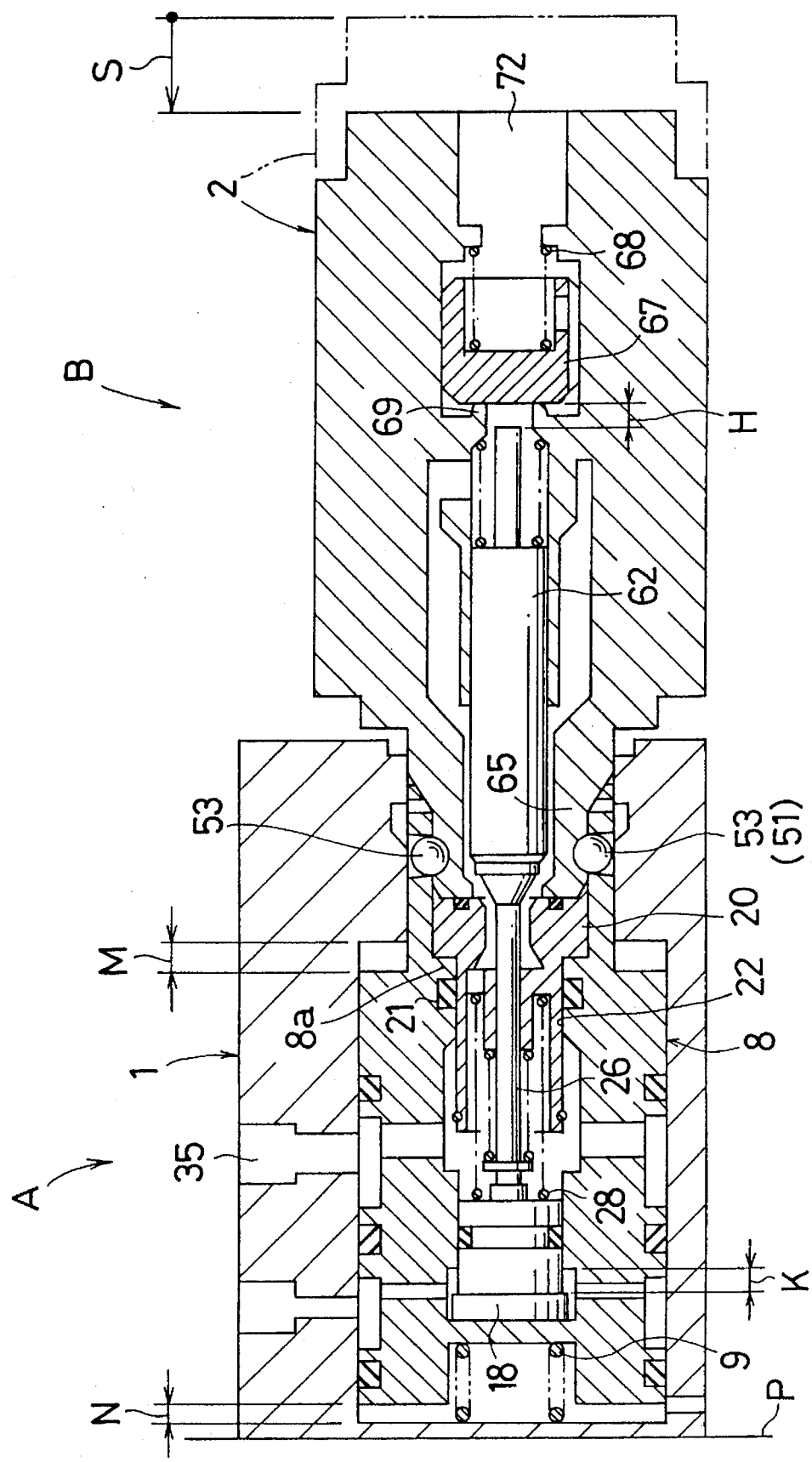

Subsequently, as shown in FIG. 5, when the cylindrical case 8 is retreated leftward by the stroke M against the advancing spring 9 by the pushing member 65, centrifugal movements of the plurality of balls 53 are prevented by the eccentric movement allowed cylinder 43 (refer to FIG. 1 ) and the cylindrical case 8 and the second housing 2 are connected so as to be axially immovable relatively. Thereby, the connection between the socket A and the plug B is completed. Under this connection completed condition, a retreat allowing clearance N is remained on the left outside of the cylindrical case 8.

The symbol S in FIG. 5 designates a connecting stroke of the second housing 2 and indicates a stroke from the connection starting condition illustrated in FIG. 2 to the connection completed condition illustrated in FIG. 5. As explained with reference to FIGS. 2 through 4, in order to bring the sliding cylinder 20 into contact with the shoulder portion 8a of the cylindrical ease 8, this connecting stroke S is set to a larger value than the advancing-retreating stroke E of the sliding cylinder 20. In order to provide the clearance N on the left side of the cylindrical case 8 under the connection completed condition illustrated in FIG. 5, the entire stroke D of the cylindrical case 8 (refer to FIG. 2) is set to a larger value than the value (herein, the stroke M ) obtained by subtracting the advancing-retreating stroke E of the sliding cylinder 20 from the connecting stroke S.

When the pressure oil is supplied to the supply-discharge port 35 for the socket under the connection completed condition, the pressure oil is supplied to an outer surrounding space of the second closing member 62 through an outer surrounding space of the first closing member 26 and then pushes and opens the check member 67 so as to be supplied to the supply-discharge port 72 for the plug. At the time of this pressure oil supply, the oil pressure applied to the inner cross-sectional area of the sealing portion of the O-ring 21 acts as the separating force onto the second housing 2 and the cylindrical case 8. But, this separating force is received by the plurality of balls 53. Therefore, the oil pressure doesn't act as an external force onto the second housing 2 and the cylindrical case 8, accordingly doesn't act as an external force also onto the first housing 1. Incidentally, only an urging force of the advancing spring 9 acts on these respective housings 1, 2.

When the pressure of the supply-discharge port 72 for the plug reaches the predetermined pressure due to the pressure oil supply to the supply-discharge port 35 for the socket, the check member 67 is brought into closing contact with the check valve seat 69 by the check spring 68. Under this condition, the pressure oil supply to the supply-discharge port 35 for the socket is stopped.

After that, the plug B is retreated rightward to be separated from the socket A. Thus, as shown in FIG. 4, the cylindrical case 8 is advanced rightward by the advancing spring 9 and the balls 53 are faced the retreating groove 54 so that the connected condition becomes possible to be cancelled. Then, as shown in FIG. 3, the first closing valve seat 31 of the sliding cylinder 20 is brought into closing contact with the first closing member 26 and the second closing member 62 is brought into closing contact with the second closing valve seat 64. About the same time, the engagement between the balls 53 and the second housing 2 is cancelled. After that, they are switched to the separated condition via the condition illustrated in FIG. 2. Since the quick-acting coupling is separated in this way under the stopped condition of the pressure oil supply to the supply-discharge port 35 for the socket, oil dripping from around the connected portion between the sealing member 32 of the socket A and the sealing surface 66 of the plug B doesn't take place.

Figure 6:
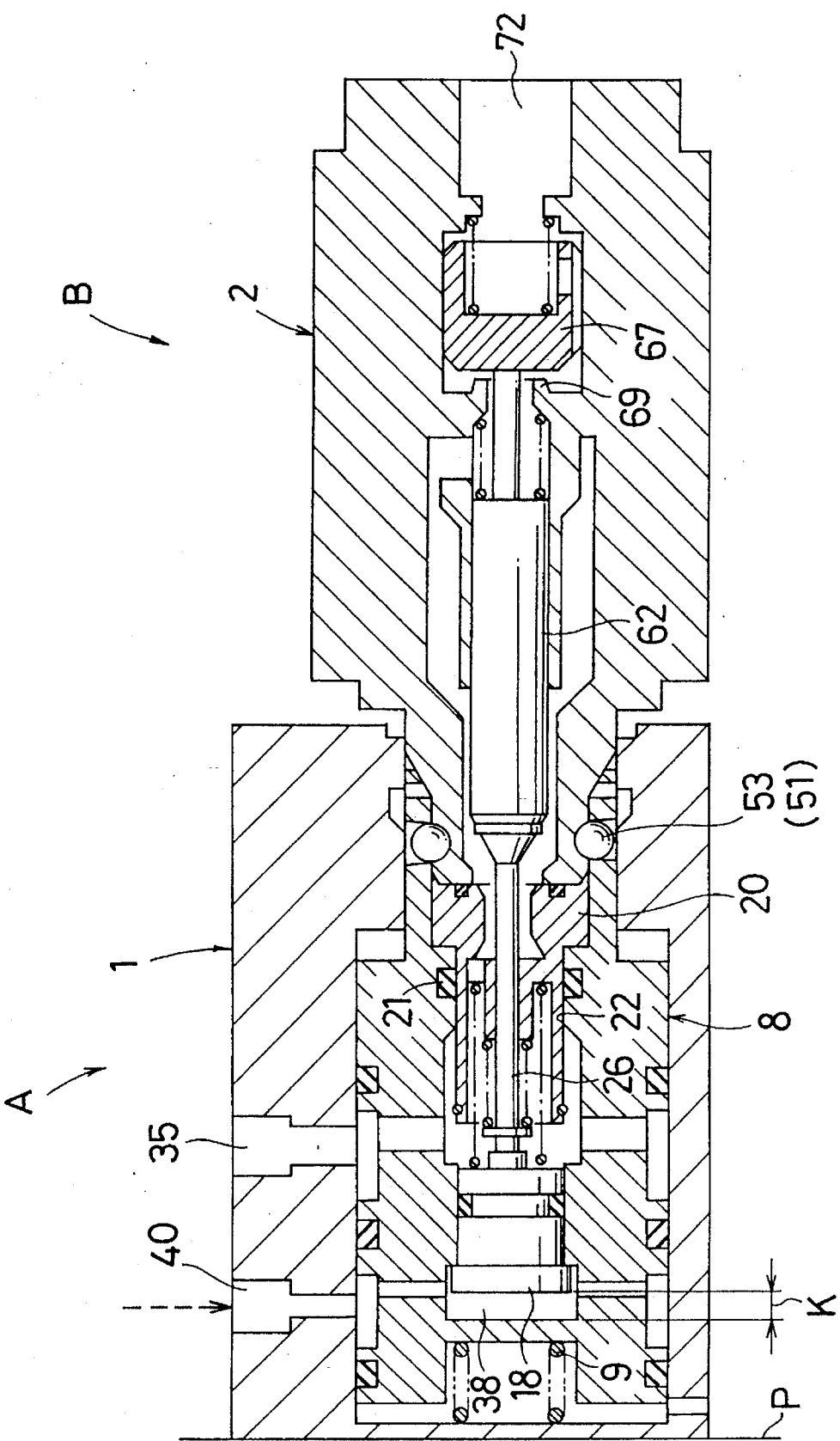
Figure 7:
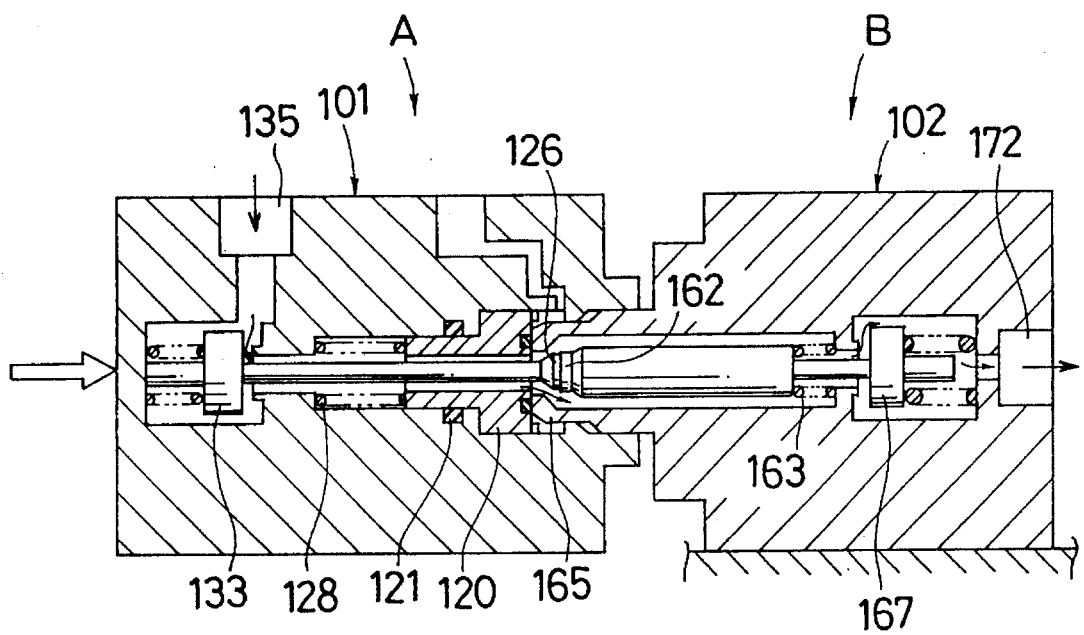
FIG. 7 shows a conventional embodiment and is a schematic view showing the connection completed condition of a quick-acting coupling.

When the pressure oil within the supply-discharge port 72 for the plug is discharged, the plug B is connected again to the socket A so as to be switched to the connection completed condition illustrated in FIG. 5 and then operated as follows as shown in FIG. 6. That is, the pressure oil is supplied to another supply-discharge port 40 of the socket A. Thereupon, the piston 18 is moved rightward by the advancing-retreating stroke K by the oil pressure of the actuation chamber 38, so that the check member 67 is pushed rightward by the piston 18 through the first closing member 26 and the second closing member 62 in order. Incidentally, it is enough to set the advancing-retreating stroke K of the piston 18 to a larger value than the clearance H illustrated in FIG. 5. When the check member 67 is separated from the check valve seat 69, the pressure oil of the supply-discharge port 72 for the plug is discharged from the supply-discharge port 35 for the socket through the outer surrounding space of the second closing member 62 and the outer surrounding space of the first dosing member 26 in order. After that, the plug B is separated again from the socket A.

The above-mentioned embodiment can be modified as follows.

The fluid to be employed in the quick-acting coupling may be a liquid such as a water or gas such as air.

Instead that the first coupling is constituted by the socket and the second coupling is constituted by the plug, the first coupling may be constituted by the plug and the second coupling may be constituted by the socket. Further, instead that the socket is mounted to the stationary side and the plug is mounted to the movable side, the plug may be mounted to the stationary side and the socket may be mounted to the movable side.

As an operating means for connecting or disconnecting the quick-acting coupling, though it is preferable to employ an actuator such as a pneumatic cylinder and a hydraulic cylinder, a small quick-acting coupling can be operated also manually.

As the advancing means of the cylindrical case, a rubber may be used and also a pneumatic spring and the like may be used instead of a spring.

The engagement means is not limited to the ball-rock type constitution but may employ such a one as being able to connect and disconnect the cylindrical case to and from the second housing, for example such a constitution as provided with a ring and an engagement groove.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments changes or modifications may be made without departing from the spirit and scope of the invention as set forth in the claims appended hereto.

What is claimed is:

1. A quick-acting coupling including a first coupling (A) and a second coupling (B) adapted to be faced and connected to each other, which coupling comprising:

a first housing (1) having an axis, a first leading end and a first base end and arranged in the first coupling (A);

a cylindrical case (8) having a bore (22) and inserted hermetically into the first housing (1) to be able to move in the axial direction;

a sliding cylinder (20) inserted hermetically into the bore (22) to be able to move in the axial direction;

a first closing member (26) inserted into the sliding cylinder (20) to be able to move in the axial direction;

an advancing means (9) for urging the cylindrical case (8) toward the first leading end;

a second housing (2) having a second leading end and a second base end and arranged in the second coupling (B);

a pushing member (65) arranged at the second leading end of the second housing (2) to push the sliding cylinder (20) toward the first base end at the time of connection of both the couplings (A) (B);

a second closing member (62) inserted into the second housing (2) to be pushed toward the second base end by the first closing member (26) at the time of connection of both the couplings (A) (B);

an engagement means (51) for connecting and disconnecting the cylindrical case (8) and the second housing (2) to and from each other; and a clearance (N) provided between the cylindrical case (8) and the first housing (1) for allowing the cylindrical case (8) to move toward the first base end at the time of completion of the connection of both the couplings (A) (B).

2. A quick-acting coupling as set forth in claim 1, wherein an entire stroke (D) of the cylindrical case (8) is set to a larger value than that obtained by subtracting an advancing-retreating stroke (E) of the sliding cylinder (20) from a connecting stroke (S) for both the housings (1) (2).

3. A quick-acting coupling as set forth in claim 2, wherein a check member (67) to be urged to a closing position on the second leading end side is disposed within the second base end portion of the second housing (2) to provide a clearance (H) between the check member (67) at the closing position and the second closing member (62) at the opening position, a piston (18) is inserted hermetically into the bore (22) of the cylindrical case (8) to be able to advance and retreat in the axial direction as well as the piston (18) is made to face the first closing member (26) from the first base end side, and an advancing-retreating stroke (K) of the piston (18) is set to a larger value than the clearance (H).

4. A quick-acting coupling as set forth in claim 3, wherein the cylindrical case (8) is constituted by one case portion (14) and the other case portion (15), the other case portion (15) is supported by the one case portion (14) to be able to diametrally move hermetically under a blocked condition of its axial movement, and the sliding cylinder (20) is inserted hermetically into the other case portion (15) to be able to advance and retreat in the axial direction.

5. A quick-acting coupling as set forth in claim 3, wherein the advancing means (9) is constituted by a spring.

6. A quick-acting coupling as set forth in claim 2, wherein the cylindrical case (8) is constituted by one case portion (14) and the other case portion (15), the other case portion (15) is supported by the one case portion (14) to be able to diametrally move hermetically under a blocked condition of its axial movement, and the sliding cylinder (20) is inserted hermetically into the other case portion (15) to be able to advance and retreat in the axial direction.

7. A quick-acting coupling as set forth in claim 2, wherein the advancing means (9) is constituted by a spring.

* * * * *